(12) United States Patent
Jester et al.

(10) Patent No.: US 8,092,877 B2
(45) Date of Patent: Jan. 10, 2012

(54) THERMOPLASTIC AROMA BARRIER INCORPORATING CYCLO-OLEFINS

(75) Inventors: Randy D. Jester, Greer, SC (US); Barbara Canale-Schmidt, North Adams, MA (US); William P. Belias, Pittsford, NY (US); Paul N. Chen, Canandaigua, NY (US)

(73) Assignees: Topas Advanced Polymers, Inc., Florence, KY (US); Pactiv Corporation, Lake Forest, IL (US)

( * ) Notice: Subject to any disclaimer, the term of this patent is extended or adjusted under 35 U.S.C. 154(b) by 2037 days.

(21) Appl. No.: 10/404,787

(22) Filed: Apr. 1, 2003

(65) Prior Publication Data

US 2004/0197505 A1   Oct. 7, 2004

(51) Int. Cl.
   *B29D 22/00* (2006.01)
   *B29D 23/00* (2006.01)
   *B32B 1/08* (2006.01)
(52) U.S. Cl. .................................. 428/36.6; 428/36.7
(58) Field of Classification Search ............... 428/36.6, 428/36.7
   See application file for complete search history.

(56) References Cited

U.S. PATENT DOCUMENTS

| 4,385,632 | A | | 5/1983 | Odelhog ...................... 604/360 |
|---|---|---|---|---|
| 6,068,936 | A | * | 5/2000 | Peiffer et al. ................. 428/500 |
| 6,096,299 | A | | 8/2000 | Guarracino et al. ......... 424/76.1 |
| 6,455,161 | B1 | * | 9/2002 | Regnier et al. ................ 428/412 |
| 6,713,152 | B2 | * | 3/2004 | Chen et al. ..................... 428/99 |
| 2003/0014947 | A1 | | 1/2003 | Deevi ............................. 53/461 |
| 2003/0179955 | A1 | * | 9/2003 | Rehwinkel ........................ 383/5 |
| 2003/0223657 | A1 | * | 12/2003 | Belias et al. ................. 383/105 |

FOREIGN PATENT DOCUMENTS

| EP | 0 392608 | | 6/1995 |
|---|---|---|---|
| JP | 08332701 A | * | 12/1996 |
| WO | WO 97/44379 | | 11/1997 |
| WO | WO/03002089 | | 1/2003 |

* cited by examiner

*Primary Examiner* — Michael C Miggins

(57) ABSTRACT

The present invention relates to polymer structures such as thermoplastic films having improved aroma barrier properties and methods for making the polymeric structures, which may be in the form of a resealable container. Aroma barrier is improved by incorporating a barrier layer of polymeric material including at least about 10 mole percent of polymerized cyclo-olefin moieties.

26 Claims, 2 Drawing Sheets

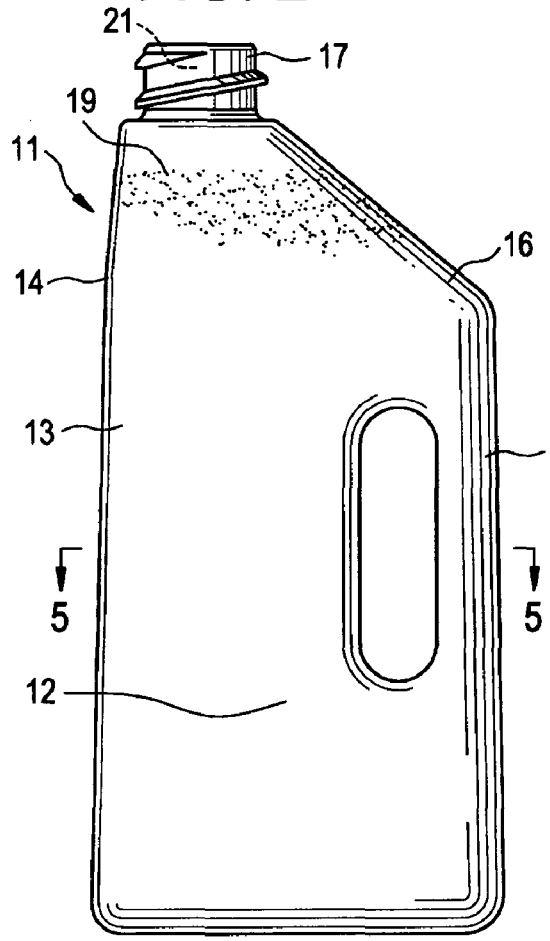
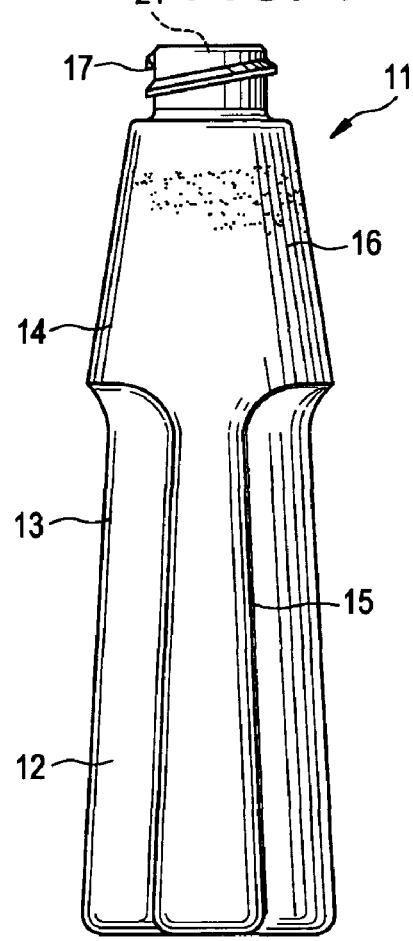
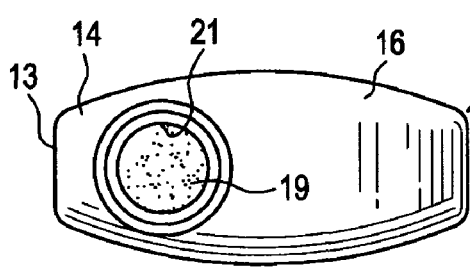
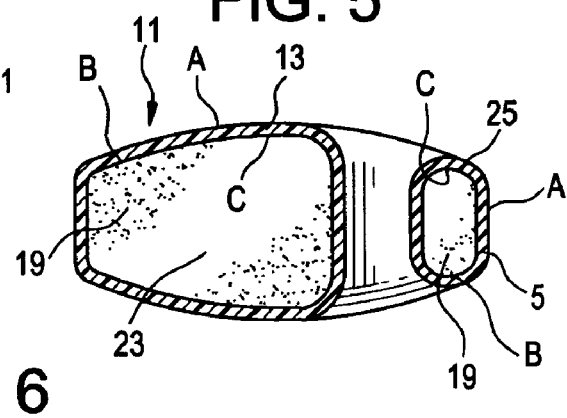
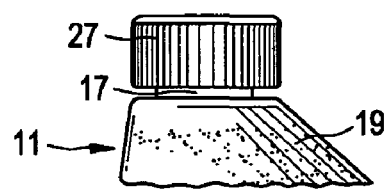

THERMOPLASTIC AROMA BARRIER INCORPORATING CYCLO-OLEFINS

BACKGROUND OF THE INVENTION

Aroma-controlling agents are known in the art. Aromas can in general be chemically classified as organic vapors being acidic, basic or neutral. For the purposes of this invention, an aroma may be defined as an organic vapor that is mixed with the atmosphere such that it does not saturate said atmosphere. Known aroma-controlling agents combat aromas based on various mechanisms such as, for example, absorption, adsorption, and inclusion complexation of aroma-causing molecules, masking and modification of aroma-causing molecules, inhibition of aroma-producing microorganisms or a combination of all these. Well-known examples of common aroma control agents include charcoal and baking soda.

WO/03002089 discloses superabsorbent carboxyl-containing polymers with aroma control properties, primarily useful in feminine hygiene product. The polymers are water-absorbent, water insoluble polymer comprising silver complex ions.

EP Publication 392,608 discloses a disposable absorbent polymer product which comprises a cyclodextrin. However, cyclodextrins are biologically degradable, and are a good nurture for microorganisms.

U.S. Pat. No. 4,385,632 discloses an absorbent article for urine which also absorbs urine odors. The articles comprise a water-soluble copper salt.

U.S. Pat. No. 6,096,299 discloses an absorbent article containing an aroma control material that comprises a zeolite.

United States Patent Publication 2003/0014947 discloses a laminate including a flavorant useful for packaging cigarettes or other products such as food products. The laminate includes cross-linked polymer coatings adhered to at least two metal foils, and a volatile flavor component such as menthol is applied to one of the polymer-coated surfaces.

Most such known aroma barriers and methods are incapable of sufficiently reducing odor and/or have other drawbacks. They often require treatments with odor absorbents, perfume, fragrance and the like. They also contain volatile ingredients as aroma-masking component; however, over time the volatile ingredients may volatilize off, effectively making the laminates or barriers unsuitable as barrier materials.

An object of the invention is to provide simple yet effective aroma control by limiting aroma transmission utilizing a polymeric barrier.

SUMMARY OF THE INVENTION

A method of reducing aroma transmission includes interposing a polymeric aroma barrier between an aroma source and its surroundings, wherein the aroma barrier includes a cyclo-olefin copolymer containing polymeric barrier layer which has at least about 10 mole percent of the residue of a cyclo-olefin monomer based on the polymer content of the barrier layer. In many preferred embodiments, the aroma barrier comprises a barrier layer consisting essentially of a melt blend of a cyclo-olefin copolymer and a polyolefin homopolymer such as polyethylene or polypropylene.

The cyclo-olefin copolymer incorporates the residue of an acyclic olefin as well as the residue of (i) the polycyclic structure of formula I, II, III, IV, V or VI, or (ii) the monocyclic structure of the formula VII:

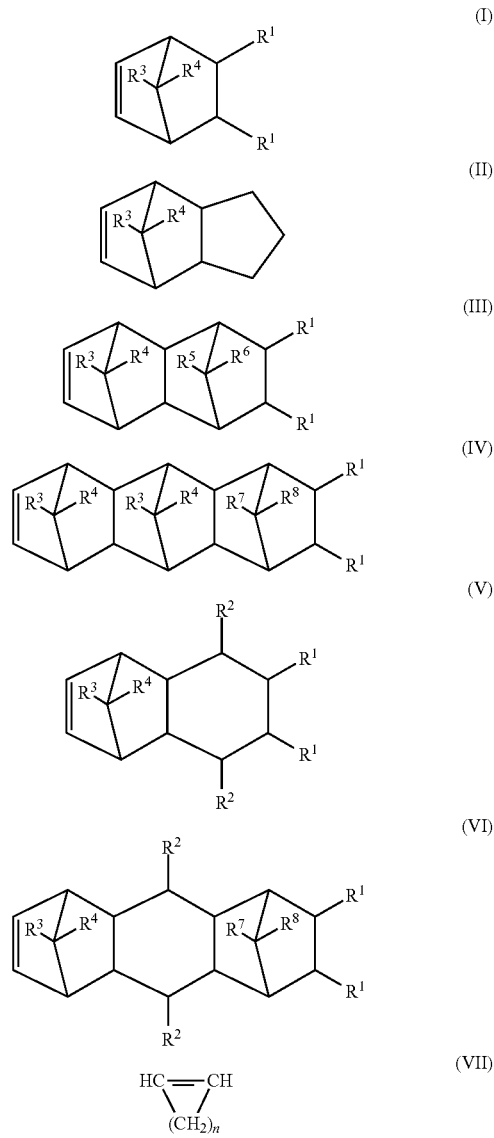

wherein $R^1$, $R^2$, $R^3$, $R^4$, $R^5$, $R^6$, $R^7$ and $R^8$ are the same or different and are H, a $C_6$-$C_{20}$-aryl or $C_1$-$C_{20}$-alkyl radical or a halogen atom, and n is a number from 2 to 10. The cyclo-olefin copolymer (sometimes referred to as COP) may include the residue of ethylene or propylene and preferably incorporates the residue of norbornene. An especially preferred cyclo-olefin copolymer is a copolymer of norbornene and ethylene, wherein said cyclo-olefin copolymer contains about 10-90 mole percent of norbornene residue and about 90-10 weight percent of ethylene residue. This may be achieved where the aroma barrier comprises a barrier layer consisting essentially of a melt blend of polyethylene and a cyclo-olefin copolymer containing about 10-90 mole percent of norbornene residue and from about 90-10 mole percent ethylene residue. In such preferred embodiments, the polyethylene is selected from the group consisting of LDPE, LLDPE, plastomers, HDPE, EVA or mixtures thereof.

Other embodiments are those where the barrier is a melt blend of about 50-90 weight percent of cyclo-olefin copolymer and 50-10 weight percent of an acyclic polyolefin (such as polyethylene, propylene and the like).

The cyclo-olefin copolymer may have a mean molecular weight, $M_w$, in the range from 200 to 200,000 and the aroma barrier may comprise at least one layer consisting of a melt blend of a cyclo-olefin copolymer and an acyclic polyolefin, wherein said cyclo-olefin copolymer is present in an amount of from about 60 to about 90 weight percent and said acyclic polyolefin is present in an amount of from about 10 to about 40 weight percent. So also, the aroma barrier may be part of a multilayer structure formed by co-extrusion, formed by lamination, formed by thermoforming, formed by extrusion-blow molding or formed by simple extrusion followed by any of a multitude of fabrication techniques to make a shaped article.

In another aspect of the invention, there is provided a method of reducing aroma transmission to an article from an aroma source comprising interposing a polymeric barrier between the article and the aroma source, wherein the polymeric barrier comprises a cyclo-olefin copolymer containing polymeric barrier layer which includes at least about 10 mole percent of the residue of a cyclo-olefin monomer based on the polymer content of the barrier layer. The various combinations referred to above are likewise employed in these aspects of the invention.

In still yet another aspect of the invention there is provided a resealable container incorporating a polymeric aroma barrier comprising a cyclo-olefin copolymer containing polymeric barrier layer which includes at least about 10 mole percent of the residue of a cyclo-olefin monomer based on the polymer content of the barrier layer as well as the combinations of materials referred to herein. Any suitable resealable container may be made, such as an extrusion blow-molded bottle which may have a multilayer structure.

The barrier layers of the present invention have mechanical advantages over known barrier material such as EVOH film in that they are readily formed and machined into a desired shape or configuration as needed. Moreover, the cyclo-olefin materials are readily recycled with blended acyclic olefins whereas films with EVOH layers or other barrier layers are not amenable to recycling.

BRIEF DESCRIPTION OF DRAWINGS

The invention is described in detail below with reference to the drawings wherein like numerals indicate similar parts and wherein:

FIG. 2 is a side elevational view of a bottled (but uncapped) laundry product in accordance with the invention;

FIG. 3 is a top plan view of the bottle of FIG. 2;

FIG. 4 is a side elevational view of said bottle, from the handle side;

FIG. 5 is a sectional plan view along plane 5-5 of FIG. 2; and

FIG. 6 is a partial side elevational view of a part of the top of the bottle of FIGS. 2-5 with a sealing cap thereon.

DESCRIPTION OF THE INVENTION

Figure 1:
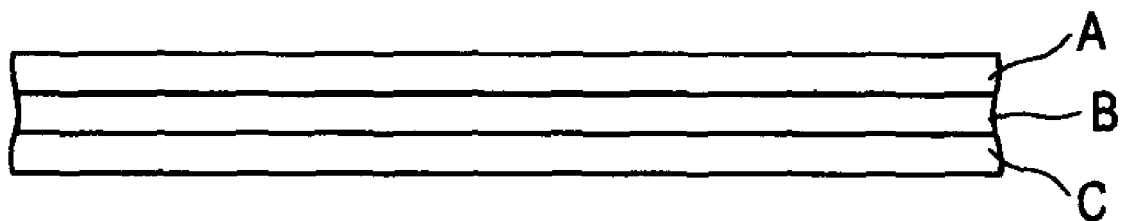
FIG. 1 is a schematic diagram illustrating the multilayer structure of Example 3.

The invention is described in detail below by reference to the various examples. Such illustration is for purposes of description only and is not limitative of the invention, the spirit and scope of which appears in the appended claims. Unless otherwise indicated, terms are to be construed in accordance with their ordinary meaning. The term "Aroma" thus refers to a dilute concentration of organic vapor; generally less than 1,000 parts per million (ppm); typically less than 500 ppm and preferably less than 100 ppm. From more than 1 to 1000 ppm is typical. The term "polymer" or "polymer resin", "polymeric" or the like includes, but is not limited to, homopolymers, copolymers, such as for example, block, graft, random and alternating copolymers, terpolymers, etc., and blends and modifications thereof. Polymer or polymer resin shall also include all possible molecular configurations of the material. These structures include, but are not limited to, isotactic, syndiotactic and atactic (random) molecular configurations.

The cyclo-olefin copolymer utilized in connection with the invention is preferably a copolymer or a terpolymer. Useful cyclo-olefin copolymers are known in the art. For example, U.S. Pat. No. 6,068,936 (Assignee: Ticona GmbH), U.S. Pat. No. 6,008,298 (also assigned to Ticona GmbH) and U.S. Pat. No. 5,912,070 (Assignee: Mitsui Chemicals, Inc.) disclose several cyclo-olefin copolymers, the disclosures of which are incorporated herein in their entirety by reference.

Cyclo-olefin copolymers which are suitable for the purposes of the present invention have a mean molecular weight $M_w$ (weight average) in the range from 200 to 200,000, preferably from 200 to 20,000, in particular from 500 to 10,000. Suitable COPs can be characterized by their glass transition temperature, $T_g$, which is generally in the range from 0 to 200° C., preferably in the range from 20 to 100° C.

Cyclo-olefins are mono- or polyunsaturated polycyclic ring systems, such as cycloalkenes, bicycloalkenes, tricycloalkenes or tetracycloalkenes. The ring systems can be monosubstituted or polysubstituted. Preference is given to cyclo-olefins of the formulae I, II, III, IV, V or VI, or a monocyclic olefin of the formula VII:

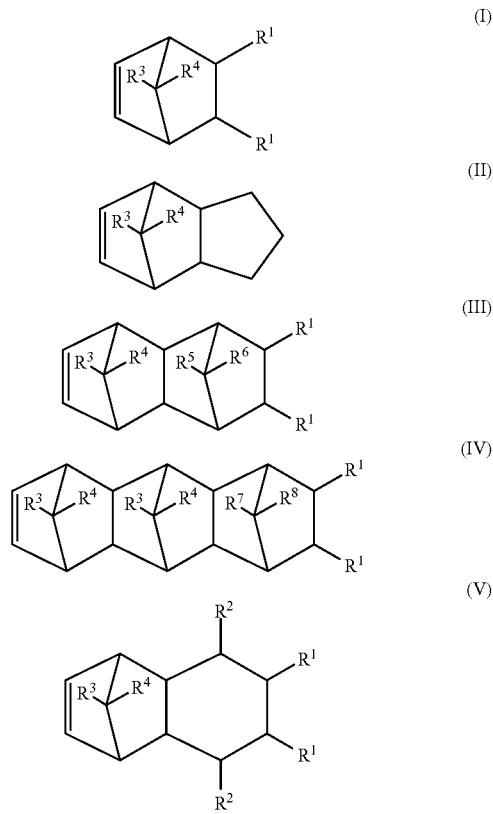

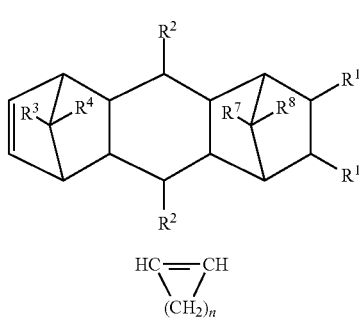

(VI)

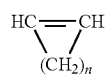

(VII)

wherein $R^1$, $R^2$, $R^3$, $R^4$, $R^5$, $R^6$, $R^7$ and $R^8$ are the same or different and are H, a $C_6$-$C_{20}$-aryl or $C_1$-$C_{20}$-alkyl radical or a halogen atom, and n is a number from 2 to 10.

In the case of cyclo-olefin copolymers, the above-described cyclo-olefin monomers can be copolymerized with suitable acyclic olefin comonomers. A preferred comonomer is selected from the group consisting of ethylene, propylene, butylene and combinations thereof. A particularly preferred comonomer is ethylene. A preferred COP contains about 10-80 mole percent of the cyclo-olefin monomer moiety and about 90-20 weight percent of the olefin moiety (such as ethylene).

A particularly preferred COP for the odor barrier layer is a copolymer of norbornene and ethylene. A preferred COP contains about 10-90 mole percent of norbornene and about 90-10 mole percent ethylene.

The cyclo-olefin polymers can be prepared with the aid of transition-metal catalysts, e.g. metallocenes. Suitable preparation processes are known and described, for example, in DD-A-109 225, EP-A-0 407 870 and EP-A-0 485 893. Molecular weight regulation during the preparation can advantageously be effected using hydrogen. Suitable molecular weights can also be established through targeted selection of the catalyst and reaction conditions. Details in this respect are given in the abovementioned specifications.

In a more preferred embodiment of the invention, the aroma barrier layer is a melt blend of a COP of norbornene and ethylene as described above, and a polyolefin. Suitable polyolefin can be a homopolymer, copolymer, terpolymer etc. and is, for example, polyethylene, polypropylene, polybutylene and the like and mixtures thereof. The term "polyethylene" shall mean families of resins obtained by substantially polymerizing the gas ethylene. Polymers which are useful in the polyethylene resin family are alpha-olefins having from 4 to 20 carbons. Non-limiting examples of suitable polyethylenes include low density polyethylene (LDPE), linear low density polyethylene (LLDPE), medium density polyethylene (MDPE), high density polyethylene (HDPE), and EVA.

Also preferred are melt blends of the COP with more than one such polyethylene, such as, for example, a tricombo blend of a COP of norbornene/ethylene (LLDPE and LDPE).

The blends for the aroma barrier layer may be prepared by methods known in the art. In one process, the cyclo-olefin copolymer and the polyolefin(s) can be incorporated into the film either as pure granules or as granulated concentrate (masterbatch) by premixing the polyolefin granules or powder with the cyclo-olefin copolymer or the COP masterbatch and subsequently feeding the premix to the extruder. In the extruder, the components are mixed further and warmed to the processing temperature. Preferably, the extrusion temperature is above the glass transition temperature $T_g$ of the cyclo-olefin copolymer. In general, the extrusion temperature is at least 100° C., preferably from 100 to 180° C., in particular from 100 to 150° C., above the $T_g$ of the cyclo-olefin copolymer.

The barrier layer can be the main part of a thermoplastic polymer structure, or alternately, be laminated, bonded to, or co-extruded with, other suitable polymers to as part of a multilayer structure. In such laminates, bonded or co-extruded structures, the barrier layer can be the interior layer or the outer surface layer or both. Thus, there can be more than one such additional layers present in the structure. Multilayer embodiments have at least two layers and always include the COP-containing aroma barrier layer and at least one further layer, it being possible for the COP-containing layer to form an interior layer or the outer layer of the multilayer structure, or both. If desired, there can be still additional layers on one or both sides. For the purposes of the present invention, the odor barrier layer makes up more than from 10 to 100%, preferably from 30 to 90%, of the total film thickness of the thermoplastic polymer structure.

The polymers for such additional layers (other than the odor barrier layer) in the multilayer structure can be selected from the group consisting of polyolefin, polyamide, polyester, polyamide, polyketone, polyketoamide, polyurethane and combinations thereof. Examples of suitable polymers are poly (m-xyleneadipamide) (MXD6), poly(hexamethylenesebacamide), poly(hexamethyleneadipamide) and poly(-caprolactam), polyesters such as poly(ethylene terephthalate), polyurethanes, polyacrylonitriles, ethylene vinyl alcohol copolymers, ethylene vinyl acetate copolymers, polyesters grafted with maleic anhydride, PVdC, aliphatic polyketone, and LCP (liquid crystalline polymers). A suitable polyketone is exemplified by Carillon®, which is produced by Shell. A suitable liquid crystalline polymer is exemplified by Vectra®, which is produced by Ticona.

The aroma barrier layer of the present invention can be formed by extrusion of the melt blend through a suitable die. The total thickness of the aroma barrier layer can vary within broad limits and depends on the intended application. The preferred embodiments of the novel film have total thicknesses of from 4 to 200 µm, preferably from 10 to 100 µm, in particular from 20 to 80 µm.

Extrusion processes per se are well-known. In the inventive process, the COP and polyolefin are compressed and melted in an extruder, the melts in the case of a multilayer film enter a feedblock together with melts from the other layers where the layer structure of the final film is generated and subsequently extruded through a flat-film die, and the resultant film is taken off over one or more rolls for solidification, oriented if desired, subsequently heat-set if desired, and, corona- or flame-treated on the surface intended for treatment, if desired. Alternatively to a flat film process a tubular film can be produced through the use of an annular die. The tubular film can be either single or multilayer. The tube can be quenched and collected for use in the final tubular shaped container. The tube can be quenched, subsequently reheated above the Tg of its components and stretched by air pressure and oriented to its final dimensions in the well known double bubble process. The extruded tube can be blown into a container shape by using a mold in a well known extrusion blow molding process. The annular melt can be expanded by air pressure and subsequently stretched to the final film thickness in the well known blown film process.

Advantageously, the take-off roll or rolls on which the extruded film is also cooled and solidified, is kept at a temperature of from 10 to 100° C., preferably from 20 to 50° C., by means of a heating and cooling circuit.

If so desired, the resultant prefilm can be stretched longitudinally and transversely to the extrusion direction, which results in a biaxial orientation of the molecular chains. The biaxial orientation can be carried out simultaneously or successively, where successive biaxial stretching, in which stretching is carried out firstly in the longitudinal direction (in the machine direction) and then in the transverse direction (perpendicular to the machine direction), is particularly favorable. The allowable stretching ratios depend upon natural stretch ratios of other polymers with the film structure. The longitudinal stretching is expediently carried out with the aid of two rolls running at different speeds in accordance with the target stretching ratio, and the transverse stretching is carried out with the aid of an appropriate tenter frame.

The temperatures at which the longitudinal stretching and the transverse stretching are carried out can vary within a broad range and depend on the particular composition of the layers and on the desired properties of the film. In general, the longitudinal stretching is carried out at from 80 to 150° C.

The biaxial stretching of the film can be followed by heat-setting (heat treatment) thereof, during which the film is typically kept at a temperature of from 100 to 160° C., preferably from 110 to 130° C., or from about 0.1 to 10 seconds. Exact temperatures depends on the specific combination of materials used in the film. The film is subsequently wound up in a conventional manner using a wind-up unit.

If so desired, the final film product can be followed by corona- or flame-treatment of one or both surfaces of the film by known methods.

The multilayer structure of the invention can be similarly made by processes known in the art such as, for example, lamination, adhesive bonding or co-extrusion. Co-extrusion can be performed similar to the process described above. The thickness of any additional polymer layer(s) present in the multilayer structure is generally, independently of one another, from 5 to 50 μm, preferably from 10 to 25 μm.

The thermoplastic polymer structure of the present invention comprising the melt blend of COP and polyolefin has excellent aroma barrier properties and, therefore, has utility in aroma removal applications, such as, for example, odors associated with food storage, garbage odors, kitchen odors, industrial and environmental odors. The inventive barrier layers may be used to control aroma transmission to and from food, for example, when they are used as part of a food container such as a bag, a bag with a closure element or elements or a resealable container including a lid and base as seen in U.S. Pat. No. 3,818,858 to Kramer et al., the disclosure of which is incorporated herein by reference. A preferred form of resealable container is an extrusion blow-molded bottle as described hereinafter.

Molecular weight Determination by GPC: The molecular weight determination for purposes of the invention disclosed and claimed herein is done by GPC method as follows. The column is divinyl benzene-crosslinked polystyrene high speed column, Type SDV 10 μm, 10e7, 10e5, 1000 Angstoms (from Polymer Standard Service, Mainz, Germany.) The column set consists of 3 in-series-connected single columns; upper size exclusion limit 2000.000 g/mol and lower size exclusion limit <1000 g/mol. The eluent is chloroform (stabilized with 1% ethanol), flow rate 2 mL/min. and the temperature is 35° C. Calibration is done using a set of narrow polystyrene standards from Polymer Standard Service, Mainz, Germany (normal calibration). Flow rate correction is by internal standard which is o-dichlorobenzene. The sample volume is 100 μL solution filtered over 1 μm TEFLON syringe filter before measurement. Sample concentration is 3.5 mg/mL. Analysis is done by PSS WINGPC Scientific, Version 6.02 from Polymer Standard Service, Mainz, Germany. The hole elugram is taken into account for the analysis. Double measurement of each value is taken and the average was taken as the final number.

The invention is further exemplified by the Examples below.

EXAMPLE 1

Preparation of a Cyclo-Olefin/Ethylene Copolymer
(See U.S. Pat. No. 6,008,298)

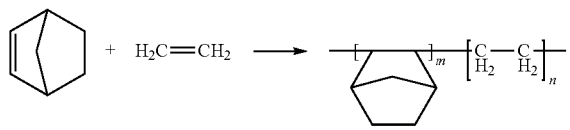

A clean and dry 75 dm³ polymerization reactor with a stirrer was flushed with nitrogen and then with ethylene and filled with 12 kg of norbornene and 15 dm³ of toluene. 300 ml of triisobutylaluminum solution (20% w/w in toluene) were added. The ethylene pressure was adjusted to an increased pressure of 18 bar. The reaction temperature was adjusted to 70° C. 20 mg of isopropenyl(cyclopentadienyl)(1-indenyl)-zirconium dichloride were dissolved in 500 ml of a toluene solution of methylaluminoxane (10% by weight of methylaluminoxane of molecular weight 1300 g/mol according to cryoscopic determination) and the solution was then metered into the reactor. The ethylene pressure was kept at 18 bar by topping up. After a polymerization time of 90 minutes, the contents of the reactor were emptied into a 150 dm³ stirred tank into which 500 g of Celite and 200 ml of water in 50 dm³ of a hydrogenated diesel oil fraction (Exxsol, boiling range 100 to 120° C. from Exxon) had been initially introduced. The mixture was stirred at 60° C. for 20 minutes. A filter cake of 500 g of Celite suspended in 10 dm³ of Exxsol was built up on the filter fabric of a 120 dm³ pressure suction filter. The polymer solution was filtered over the pressure suction filter. A nitrogen pressure of 2.8 bar was built up over the solution. The mixture was then filtered over seven filter candles (Fluid Dynamics, Dynalloy XS 64.5 μm 0.1 m²/candle), which were mounted in a steel housing. The polymer solution was stirred into 500 dm³ of acetone by means of a disperser (Ultraturrax) and thereby precipitated. The suspension was circulated over a 680 dm³ stirred pressure suction filter with the bottom valve open. After the bottom valve had been closed, the residue was washed three times with 200 dm³ of acetone. After the last washing, the product was pre-dried in a stream of nitrogen at 60° C. and dried in a drying cabinet for 24 hours under 0.2 bar and at 80° C. 5.37 kg of polymer were obtained. The viscosity number was 51 ml/g and the glass transition temperature was 105° C.

EXAMPLE SERIES 2

Preparation of a Cyclo-Olefin Copolymer Odor
Barrier Film and Testing as Aroma Barrier The COP polymer used in the melt blend of the barrier layer was TOPAS 8007® (available from Ticona, Summit, N.J.), which is a copolymer of norbornene and ethylene having 36% norbornene and a Tg of 80° C. ($M_w$ 100.000 g/mol, $M_n$ 47.000 g/mol, $M_w/M_n$=2.1, measured by GPC as described above). A series of films were prepared by pellet blending and extruding TOPAS 8007 AND Dow 2045 LLDPE as follows. Pellet blend samples of 100% Topas 8007 COP, 80% 8007+20% Dow 2045, 60% Topas 8007+40% Dow 2045, 20% Topas 8007+80% Dow 2045, and 100% Dow 2045 were manually blended by tumbling in a container. Each of the samples was extruded using a 1" killion laboratory extruder equipped with a 8" flat die. Extruder temperatures were adjusted to obtain a melt temperature of 230 C for each example. The cast films were cooled and solidified on a casting roll at 30 C. Monolayer cast films of 50 micron thickness were produced from each polymer variant. The film specimens were placed into a diffusion cell, where saturated d-Limonene vapor ("the odor") challenged one side of the film and dry nitrogen gas swept the opposite side of the film.

Test temperature was held constant at 23° C. Any organic vapor that permeated across the polymer material was "picked up" by the nitrogen carrier gas stream and brought to a flame ionization detector (FID) for quantifying. D-Limonene transmission rate was between 40-80 g/m$^2$ day through all of the test 30 samples (in duplicate experiments). The transmission rates observed for all of the samples show no correlation with COP content and are within the normal variability of the measurement process at these high transmission values. These tests demonstrated that the COP content of the film had little or no impact on organic vapor transmission at high concentrations of vapor.

| Sample Description | ug/m2 day d-limo TR Replicate A | ug/m2 day d-limo TR Replicate B |
| --- | --- | --- |
| 100% Topas 8007 | 7.5E+07 | 4.6E+07 |
| 80% Topas 8007 | 1.0E+08 | 3.8E+07 |
| 60% Topas 8007 | 3.9E+07 | 7.0E+07 |
| 20% Topas 8007 | 7.2E+07 | 4.7E+07 |
| 100% Dow 2045 LLDPE | 7.3E+07 | 7.7E+07 |

EXAMPLE SERIES 3

Effect of Cop Content in the Barrier Layer on Aroma Transmission

The effect of varying concentration of COP in melt blend of the barrier layer on aroma removal was studied as follows. An ABC co-extruded multilayer film was produced having the following structure:
A (20 weight % polyethylene Plastomer 80 weight % Topas 8007 COP copolymer), pellet blended
B (70 weight % polymer carrier compounded with 30 weight % fragrance ("the odor") (fragrance is 70% d-limonene+30% assorted floral scents)
C (80 weight % polyethylene(LLDPE/20 weight % Topas 8007 copolymer), pellet blended
These compounds were extruded and introduced into a three layer blown film die followed by a conventional film blowing and collapsing process to produce a 3-mil film having a 1-mil of A (outside of blown film bubble)/1-mil of B/1-mil of C structure (inside of blown film bubble); the structure of which film is shown schematically in FIG. 1.

Thus, layer C had a lower concentration of the COP than layer A. Layer B provided a fragrance reservoir in the film center for the continuous permeation of aroma out of the film. Total organic transmission rate was measured through both sides of the co-extruded film structure. For this analysis, two film samples were sectioned from the co-extruded film. The first sample was placed into a diffusion cell and dry nitrogen gas was allowed to purge over each side of the sample. The carrier gas line from the top side of the diffusion cell was analyzed on Cell A of an Aromatran 1A Organic Permeation Rate Instrument, while the bottom side of the diffusion cell was analyzed on Cell B. To double-check the results, the second film sample was analyzed in this manner, but with the "inside" and "outside" film orientation reversed.
Results:
The C-Layer had an aroma transmission rate of 120,000 to 150,000 units (in duplicate experiments);
The A-Layer had aroma transmission rate of 17,000 to 22,000 (in duplicate experiments);
Ratio (inside (B-Layer/outside (A-Layer): 6.8 to 7.1.
This study clearly demonstrated that the Inside film (the lower COP content "C" film) transmitted at a rate of nearly 7× the rate of the outside film (the higher COP content "A" film.

The foregoing demonstrates the surprising aroma barrier properties that are achieved with the invention, even though the cyclo-olefin content has little, if any effect at high concentrations.

Without intending to be bound by any theory, it is believed that the COP forms domain type structures in the blended polymer phase and the domain type structures act as the aroma barrier. Thus, one would expect a blended polymer containing a high concentration of COP to act as an increased aroma barrier. Conversely, a blended polymer containing a low concentration of COP should act as a poor aroma barrier. In fact, melt blending of COP with polyolefins such as LDPE, LLDPE, and Plastomers has been shown to form domain type structures as opposed to a fully miscible "solution" of the polymers. At high COP concentrations (example, over 70% COP) the COP is expected to be the continuous phase with polyolefin domains, thus resulting in increased aroma barrier. At low COP concentrations (example, less than 30% COP) the polyolefin is expected to be the continuous phase with COP domains, resulting in decreased aroma barrier. Morphology may be more unpredictable in the intermediate concentrations.

The inventive barrier layers are particularly suitable for resealable containers such as those which may contain food, scented laundry products (e.g., detergent, fabric softener) or scented personal care products since the containers will prevent migration of odors to or from their contents. There is shown in FIG. 2 bottle 11, of transparent 3-layer structure, A, B, C, which includes a body portion 13, having a handle 15 integrally blow-molded with it, and a neck portion 17. While the bottle may be of various shapes, the preferred structure shown is substantially oval in general cross-section, at least in the upper and lower portions thereof, and has the neck or pour spout section at the top of the bottle and nearer to one end of the major horizontal axis of such oval, with the handle being at or near the opposite end of said axis. Also, it is preferred that upper portion 14 of body wall 12, the portion nearer to the dispensing neck end, should be nearly vertical, i.e., about 70° to 90° from the horizontal, and upper portion 16, nearer to the handle end (both neck and handle being at ends of the bottle major or long horizontal axis) should be less vertical, i.e., 30° to 60°, for reasons which will be given later. Inside bottle 11 is a laundry detergent composition 19, which is readily dispensable through passageway 21 in the bottle neck by merely tipping the bottle and pouring the material out therefrom. The mentioned described parts are also shown in FIGS. 3 and 4, where appropriate.

In FIG. 5 a portion of the main volume 23 of the bottle is illustrated, as is a part of the interior passageway 25 through handle 15. As shown, both are filled with composition 19.

In FIGS. 2-5 the bottle is shown uncapped but for normal sealing and shipping of a laundry product, for example, an internally threaded screw cap 27, shown in FIG. 6, will be screwed in place on threaded neck 17. Normally the cap material on the bottle will be sufficiently resilient so that sealing washers will not be employed (a sealing bead may often suffice) but such washers may be used when desired. Of course, cap 27 of FIG. 6 may also be considered as being in place on the threaded necks of the bottles of FIGS. 2-5 and therefore additional views showing such positioning are not given.

The container of FIGS. 2-6 is preferably an extrusion blow-molded bottle, the method of making which is well known as is seen, for example, in U.S. Pat. No. 6,312,248 to Lopez et al. and U.S. Pat. No. 4,549,977 to Joshi et al., the disclosures of which are hereby incorporated by reference.

While the present invention has been described in conjunction with the specific embodiments set forth above, many alternatives, modifications and variations thereof will be apparent to those of ordinary skill in the art. All such alternatives, modifications and variations are intended to fall within the spirit and scope of the present invention which is set forth in the appended claims.

What is claimed is:

1. A method of reducing aroma transmission comprising interposing a polymeric aroma barrier between an aroma source and its surroundings, wherein the aroma barrier consists essentially of a melt blend of cyclo-olefin copolymer and acyclic polyolefin wherein the polymeric barrier layer includes at least about 10 mole percent of the residue of norbornene monomer based on the polymer content of the barrier layer, and wherein said cyclo-olefin copolymer consists essentially of the residues of norbornene and ethylene.

2. The method of claim 1, wherein said blend comprises about 50-90 weight percent of said copolymer and 50-10 weight percent of said acyclic polyolefin.

3. The method according to claim 1, wherein said aroma barrier comprises at least one layer consisting of a melt blend of the cyclo-olefin copolymer and an acyclic polyolefin, wherein said cyclo-olefin copolymer is present in an amount of from about 60 to about 90 weight percent and said acyclic polyolefin is present in an amount of from about 10 to about 40 weight percent.

4. The method of claim 1, wherein said polymeric barrier layer is formed by extrusion.

5. The method of claim 1, wherein said aroma source comprises organic vapor with a concentration of less than 500 ppm.

6. The method of Claim 1, wherein said aroma source comprises organic vapor with a concentration of less than 100 ppm.

7. The method of claim 1, wherein the cyclo-olefin copolymer is present in the barrier layer in an amount of greater than 70 wt.%.

8. The method of claim 1, wherein said acyclic polyolefin is a homopolymer.

9. The method of claim 8, wherein said acyclic polyolefin is polyethylene.

10. The method of claim 1, wherein said cyclo-olefin copolymer contains about 10-90 mole percent of norbornene residue and about 90-10 mole percent of ethylene residue.

11. The method according to claim 10, wherein the aroma barrier comprises a barrier layer consisting essentially of a melt blend of polyethylene and the cyclo-olefin copolymer containing about 10-90 mole percent of norbornene residue and from about 90-10 mole percent ethylene residue.

12. The method of claim 11, wherein said polyethylene is selected from the group consisting of low density polyethylene, linear low density polyethylene, plastomers, high density polyethylene, ethylene vinyl acetates or mixtures thereof.

13. The method of claim 12, wherein said polyethylene is linear low density polyethylene.

14. The method of claim 11, wherein said cyclo-olefin copolymer has a mean molecular weight, $M_w$, in the range from 200 to 200,000.

15. The method according to claim 1, wherein said aroma barrier is part of a multilayer structure.

16. The method of claim 15, wherein said multilayer structure is formed by co-extrusion.

17. The method of claim 15, wherein said multilayer structure is formed by lamination.

18. The method of claim 15, wherein said multilayer structure is formed by thermoforming.

19. The method of claim 15, wherein said multilayer structure is formed by extrusion-blow molding.

20. The method of claim 15, wherein the barrier layer has a thickness in the range of from 4 µm to 80 µm.

21. The method of claim 15, wherein the barrier layer has a thickness in the range of from 20 µm to 80 µm.

22. The method of claim 15, wherein the barrier makes up from 30 to 90% of the total film thickness of the multilayer structure.

23. A method of reducing aroma transmission comprising substantially surrounding an aroma source with a polymeric aroma barrier film to isolate the aroma source from its surroundings, wherein the aroma barrier film is a multilayer structure comprising a polymeric barrier layer which consists essentially of a melt blend of cyclo-olefin copolymer and an acyclic polyolefin, and wherein the barrier layer includes at least about 10 mole percent of the residue of norbornene monomer based on the polymer content of the barrier layer.

24. A method of reducing aroma transmission comprising interposing a polymeric aroma barrier between an aroma source and its surroundings, wherein the aroma barrier comprises a cyclo-olefin copolymer containing polymeric barrier layer having a thickness of from 4 microns to 200 microns which layer includes at least about 10 mole percent of the residue of norbornene monomer based on the polymer content of the barrier layer, wherein said cyclo-olefin copolymer consists essentially of the residues of norbornene and ethylene, and wherein the aroma barrier comprises a barrier layer which consists essentially of a melt blend of the cyclo-olefin copolymer of norbornene and ethylene with an acyclic polyolefin, and wherein further the blend comprises about 50-90 weight percent of said copolymer and 50-10 weight percent of said acyclic polyolefin.

25. A method of reducing aroma transmission comprising interposing a polymeric aroma barrier between an aroma source and its surroundings, wherein the aroma barrier comprises a layer which includes a polymer blend of cyclo-olefin copolymer and acyclic polyolefin, wherein the barrier layer is at least 70 weight % cyclo-olefin copolymer, and wherein the barrier layer includes at least about 10 mole of the residue of a cyclo-olefin monomer based on the polymer content of the barrier layer.

26. The method according to claim 25, wherein the acyclic polyolefin includes LLDPE and LDPE.

* * * * *